Patented May 24, 1932

1,859,926

UNITED STATES PATENT OFFICE

HARRY M. LARMOUR AND STEPHEN C. PIERCE, JR., OF MERCED, CALIFORNIA, ASSIGNORS TO YOSEMITE PORTLAND CEMENT CORPORATION, OF MERCED, CALIFORNIA, A CORPORATION OF DELAWARE

CEMENT CLINKER TREATMENT

No Drawing.   Application filed March 19, 1929.   Serial No. 348,352.

The objects of the invention are to provide an improvement in the treatment of the clinker whereby a much better cement may be ground therefrom, one which exceeds in tensile and compressive strength ordinary cements and is superior in the matter of plasticity and workability.

In the usual manufacture of cement the raw materials, limestone and clay, or such substitutes for these as may be found economical and advisable are ground finely or disintegrated, either wet or dry, and then intimately mixed in the proper proportions, and introduced into a rotary kiln or upright kiln. In the kiln the material is gradually heated to about 2800° F. or until it reaches a point of semi-fusion, the limestone has been completely calcined, and the material forms various sized lumps known as clinker. This clinker is discharged from the kiln and cooled either by air or water in varying quantities in order that it may be readily handled in the rest of the process. After cooling the clinker is finely ground, usually with a retarder, such as gypsum, to make the ordinary cement, and some other admixtures are occasionally added for the purpose of imparting certain useful and desirable properties.

Our invention concerns only that stage in the process between the point where the clinker reaches the maximum temperature in the kiln and the point at which the clinker is sufficiently cool for stability of compound and ready for subsequent grinding in the usual manner to produce the cement.

As noted above, the common practice consists in cooling the clinker in air either by means of rotary coolers where the clinker is introduced into a cylinder which is rotated, and passing air through the same so as to allow the air to act on it in large volumes and rather rapidly reduce the temperature. Other methods employ cooling towers to expose the clinker to large volumes of air, or simply pile the material up in some convenient place exposed to the open air and allow natural radiation to take its course. Still others speed up the rate of cooling by drenching in water or some other suitable liquid in either large or small quantities.

Our procedure is, however, entirely different from the above mentioned methods, in that we cool the material in an atmosphere as nearly free from air as it is practicable to attain, as we have discovered that by eliminating oxygen during the cooling process, a cement made of the clinker will show marked superiority over that made from clinker cooled in presence of oxygen.

In carrying out our process the hot clinker is taken from the kiln, of any type, preferably at the temperature nearest to maximum possible in practice, and introduced into a container of any sort which will permit the exclusion of air and is closed therein, and preferably the clinker is compacted into the container so as to reduce to a minimum any voids containing air.

We have also discovered that it is an advantage to further reduce the air or oxygen and/or prevent its access to the hot clinker, by mixing into the same a reducing agent or substance adapted to absorb any oxygen present, such for instance as ground coke, coal, sulfur, fuel oil, or used lubricating oil. Sufficient of the reducing material is used to accomplish the desired results, in the case of coke about a tablespoonful to a shovelful of clinker has been found satisfactory proportions.

For continuous production the containers may take the form of long cylinders or large pipes with the clinker as received from the kiln passed through the pipes by conveyor or any suitable means, and the reducing agent introduced at the beginning of or at some point along the pipes through any suitable sealing gate to avoid injurious admission of air.

The clinker is then allowed to cool while in the container and may be hastened in cooling by means of a current of cool air or a stream of water on the outside of the container, to expedite production, though the rate of cooling appears to be of little importance on the quality of the product.

Clinker treated or cooled in accordance with our invention has a number of marked physical characteristics, as follows: It is decidedly heavier per unit volume than some of the same clinker cooled in one of the ordinary manners. Instead of being in the usual lumps of small size a great portion is more or less fused together, giving the appearance of a conglomerate. In some cases the color of the clinker was altered to a slight extent but the ultimate results seemed to have no bearing on the color.

This specially treated clinker, after cooling to below 600° F., but preferably below 400° F. according to our method is then ready for grinding to cement in the usual manner and the resultant product has shown itself to be much superior to cement ground to the same fineness from clinker out of the same batch cooled in the ordinary manner, as shown by laboratory tests. The advantages gained were increased strength and plasticity.

We are not definitely aware of the reactions involved in our treatment of cement clinker, but we do feel that there is either a chemical or physical reaction which takes place, or is arrested in the usual methods of cooling clinker which this process of cooling in an atmosphere other than air entirely changes and produces a clinker which in turn makes a cement of improved qualities, having marked advantages over ordinary cements and that this discovery will permit the manufacture of an improved cement at a cost to make its use very general.

We have found that our treatment of cooling clinker is of value when practiced on clinker having a temperature as low as 1100° F. but is most efficient when practiced with clinker at higher temperatures and, so far as we have been able to determine, the hotter the clinker treated by our process the better the resultant cement made therefrom.

We do not limit ourselves to the way in which our process is mechanically carried out as of course there are numerous ways of accomplishing this result.

We claim:

1. In the process of making Portland cement, the method of treating the hot clinker from the kiln which comprises introducing coke to the hot clinker and cooling the mass while maintaining the same substantially free from contact with oxygen.

2. In the process of making Portland cement, the method of treating the hot clinker from the kiln which comprises introducing oil to the hot clinker and cooling the mass while maintaining the same substantially free from contact with oxygen.

3. In the process of making Portland cement, the method of treating the hot clinker from the kiln, which comprises introducing to said hot clinker material selected from the group consisting of coke, coal and oil, and cooling the mass while maintaining the same substantially free from contact with oxygen.

HARRY M. LARMOUR.
STEPHEN C. PIERCE, Jr.